United States Patent
Fatehi et al.

(10) Patent No.: US 11,080,060 B2
(45) Date of Patent: Aug. 3, 2021

(54) PREVENTING OPERAND STORE COMPARE CONFLICTS USING CONFLICT ADDRESS DATA TABLES

(71) Applicant: International Business Machines Corporation, Armonk, NY (US)

(72) Inventors: Ehsan Fatehi, Austin, TX (US); Brian W. Thompto, Austin, TX (US); John B. Griswell, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/391,814

(22) Filed: Apr. 23, 2019

(65) Prior Publication Data

US 2020/0341769 A1    Oct. 29, 2020

(51) Int. Cl.
G06F 9/32       (2018.01)
G06F 9/30       (2018.01)
G06F 9/38       (2018.01)
G06F 12/0864    (2016.01)

(52) U.S. Cl.
CPC ............ *G06F 9/32* (2013.01); *G06F 9/30043* (2013.01); *G06F 9/30145* (2013.01); *G06F 9/3834* (2013.01); *G06F 9/3838* (2013.01); *G06F 9/3867* (2013.01); *G06F 12/0864* (2013.01)

(58) Field of Classification Search
CPC ...... G06F 9/3838; G06F 9/32; G06F 9/30043; G06F 9/30145; G06F 9/3867; G06F 12/0864
USPC ........................................ 712/227, 216, 219
See application file for complete search history.

(56) References Cited

U.S. PATENT DOCUMENTS

| | | | |
|---|---|---|---|
| 8,285,947 B2 | 10/2012 | Beaumont-Smith et al. | |
| 9,524,165 B1 | 12/2016 | Hutton et al. | |
| 10,013,257 B2 | 7/2018 | Hutton et al. | |
| 2013/0326198 A1* | 12/2013 | Meier | G06F 9/3834 712/216 |
| 2016/0117174 A1* | 4/2016 | Chadha | G06F 9/3838 712/206 |
| 2017/0329715 A1* | 11/2017 | Eickemeyer | G06F 9/3834 |

(Continued)

FOREIGN PATENT DOCUMENTS

EP    0742512 A2    11/1996

OTHER PUBLICATIONS

"Dynamic prefetcher adjustment interface", An IP.com Prior Art Database Technical Disclosure, Authors et. al.: Disclosed Anonymously, IP.com No. IPCOM000233783D, IP.com Electronic Publication Date: Dec. 19, 2013, 4 pages.

(Continued)

*Primary Examiner* — Shawn Doman
(74) *Attorney, Agent, or Firm* — David K. Mattheis; William H. Hartwell; Nicholas L. Cadmus

(57) ABSTRACT

Managing application execution by receiving a store instruction, including a store instruction itag and store instruction address, creating a hash of the store instruction address, receiving a load instruction and matching a hash of a store instruction address associated with the load instruction with the hash of the store instruction address associated with the store instruction. The store instruction itag is sent to an instruction sequencing unit (ISU). The ISU delays execution of the load instruction according to the received itag.

6 Claims, 4 Drawing Sheets

(56) References Cited

U.S. PATENT DOCUMENTS

2017/0344381 A1* 11/2017 Hutton ............... G06F 9/30145
2017/0351522 A1* 12/2017 Ayub ................. G06F 9/30043

OTHER PUBLICATIONS

"Hybrid Cache with Dynamically Allocatable Software Addressable Lines", An IP.com Prior Art Database Technical Disclosure, Authors et. al.: Disclosed Anonymously, IP.com No. IPCOM000240882D, IP.com Electronic Publication Date: Mar. 9, 2015, 2 pages.

IBM, "Method of avoiding memory ambiguity flushes in a microprocessor using a memory dependency table", An IP.com Prior Art Database Technical Disclosure, Original Publication Date: May 4, 2009, IP.com No. IPCOM000182613D, IP.com Electronic Publication Date: May 4, 2009, 3 pages.

IBM,"POWER8 Processor User's Manual for the Single-Chip Module", Mar. 16, 2016, Version 1.3, 450 pages.

Mell et al., "The NIST Definition of Cloud Computing", Recommendations of the National Institute of Standards and Technology, Special Publication 800-145, Sep. 2011, 7 pages.

* cited by examiner

PREVENTING OPERAND STORE COMPARE CONFLICTS USING CONFLICT ADDRESS DATA TABLES

BACKGROUND

The disclosure relates generally to managing system memory operations. The disclosure relates particularly to managing load and store command conflicts.

Computer programs provide a listing of instructions, or commands, in sequential order from start to finish. At the time of execution of the program, the commands may be executed in the sequence they are written, or the commands may be executed out-of-order to realize efficiencies in program execution. The efficiencies arise by reducing the processor cycles per instruction (CPI) required by executing the commands out of the written order.

Branching instructions illustrate an out-of-order opportunity. After reaching a branching instruction decision point, several processor clock cycles may be needed to resolve the decision and determine the correct path forward from the decision point. During those clock cycles, the program may execute instructions along each possible path forward from the decision point.

SUMMARY

Aspects of the invention disclose methods, systems and computer readable media associated with managing the execution of microprocessor load and store commands. In one aspect, managing application execution includes receiving a store command including a store itag and store instruction address, creating a hash of the store instruction address, receiving a load instruction and matching a hash of a store instruction address associated with the load instruction with the hash of the store instruction address of the store command. The store itag; is provided to an instruction dispatch and issue unit (ISU). The ISU delays execution of the load instruction according to the store itag.

DETAILED DESCRIPTION

Figure 1:
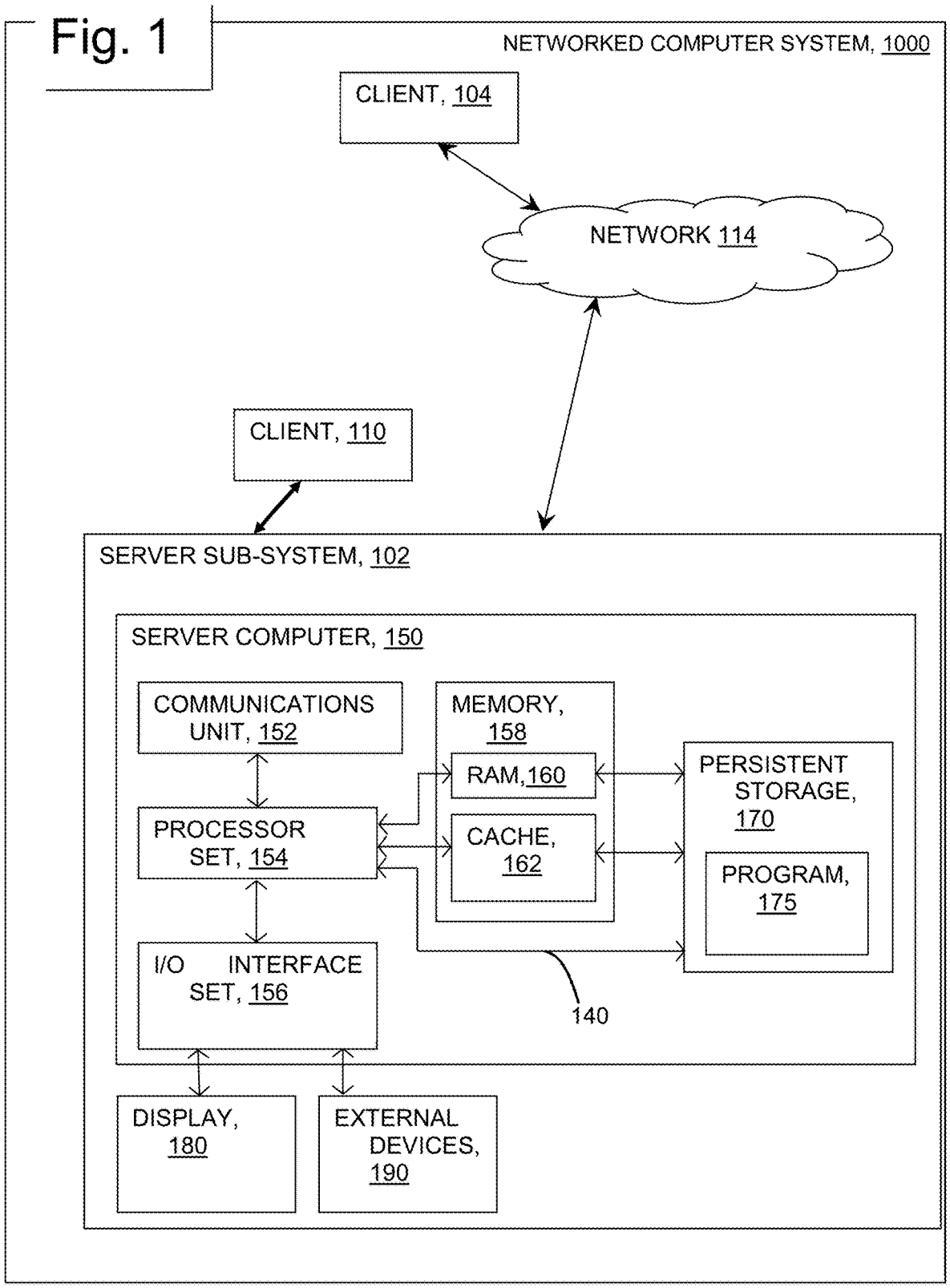
FIG. 1 provides a schematic illustration of a system, according to an embodiment of the invention.

Out-of-order execution may reduce processor cycles per instruction (CPI) required to execute an entire set of program commands but is not risk free. Operand store compare (OSC) conflicts arising from out-of-order execution can lead to wasted processor cycles and contribute to higher CPI numbers. An OSC conflict is defined as a conflict between an instruction with an operand to store data to memory and an instruction to load the data from the memory. Such conflicts may require the re-execution of the instructions, increasing the CPI of the instructions.

A load-hit-store (LHS) OSC conflict occurs when a load instruction is issued after the issuance of a store instruction, but before the store instruction has completed. This OSC LHS conflict is detected on the load instruction causing it to be rejected and reissued, wasting processor cycles. Depending upon the distance in execution between the load and the store, as well as the duration required to complete the store, the reissued load instruction may also have an OSC LHS conflict resulting in a second rejection and reissuance of the instruction.

A store-hit-load (SHL) conflict occurs when the load instruction is issued before the store instruction. This OSC SHL conflict is detected on the store instruction, after the load instruction has completed. Detecting the conflict after the load has completed may result in the need to flush the load result and any results from commands issued subsequent to the load command. Flushing the command and results may require re-fetching the commands from memory before they can be decoded and reissued resulting in a large SHL related CPI penalty.

Absent an intervening mechanism, the OSC conflicts may reoccur each time the rejected or flushed instructions are reissued, as the underlying execution conflict has not been resolved. The OSC conflicts may also occur each time the relevant portion of the instruction set is executed due to the load-store instruction sequencing in the underlying program. Predictable OSC conflict issues could be reduced by forbidding the out-of-order execution of all load store combinations, but that would have a negative impact on system performance. OSC conflicts may also be reduced by delaying the execution of load instructions having an OSC conflict until the associated store instructions have completed.

Data tables associated with load and store commands have been used to delay the execution of load commands. Load-Hit-Store (LHS) tables have included the instruction tag of store commands having OSC conflicts, as well as the command parameters associated with the store command. Instruction tags (itags) are assigned to instructions each time they pass through the execution pipeline of the computer. The itags are sequential, proceeding from smaller to larger itag values. The itags indicate the sequential order of instruction execution. Store-Hit-Load (SHL) tables have included an index and a load tag value, each derived from the load command EA, for load commands recognized as having an OSC conflict. Like a directly mapped cache storage, the index can comprise a portion of the bits of the load EA, the load tag can comprise additional bits of the load EA. SHL table entries have also included a calculated difference between the itags of conflicting load and store command (an itag delta). The index and load tag identify individual SHL table entries. The load tag is used to match subsequent load commands. As a load command is processed, the load tag for the command is derived from the load instruction EA. The derived load tag can then be matched to SHL table entries having the same load tag. The load tag values allow subsequent executions to be matched to previous OSC load-store conflicts in SHL table entries.

In an embodiment, OSC conflicts can be reduced by a new use of a combination of Store Hit Load (SHL) and Load Hit Store (LHS) tables. As each OSC related store instruction is decoded, a hash of the effective address (EA) for the instruction is created. The effective address (EA) tag of a store instruction is determined at the compile time of the instruction from the instruction's text. When an OSC conflict arises, the EA tag of the store instruction can be associated with a corresponding load instruction. The load and store commands having the OSC conflict can be paired. An SHL table entry can be created including the index and load tag of the load instruction together with a hash of the EA of the conflicting store instruction. An LHS table entry can be created including the store itag and a hash of the store command EA.

In an embodiment, the entire EA of the store instruction may be stored in the LHS table and/or the SHL table, for comparison, in this embodiment, the "hash" of the EA is the entire EA. Similarly, the entire load instruction address may be stored in the SHL rather than the index and load tag. In an embodiment, a hash function may be used to map the EA tags to a standard size and to make the comparison of SHL and LHS table entries less complex.

In an embodiment, the SHL table entries may be fully associated using the entire load EA values rather than index and tag values to differentiate between load EA values. In an embodiment, the table values may be stored in a 2-way set associative cache, again using an index and tag derived from the load EA, to differentiate values.

In an embodiment, the EA values may be hashed by taking the final three bits of the address and converting the value from hexadecimal to binary and then shortening the binary value by removing the final two bits. For example, EA=0x0123F56, taking the last three bit values, F56 and converting to binary, 0b111101010110, removing the final two bits yields a hash value of 1111010101. As an alternative, the binary value may be split between the upper and lower bits and an exclusive or, xor, function performed on the portions: 111101010110 becomes 111101 and 010110, after the xor: 101011, for the hash value of the address.

For each load instruction, the load EA is hashed creating a load tag, and a search is made for the load tag in the SHL table entries. A match indicates an OSC conflict with a corresponding store instruction of an LHS entry. The hashed store instruction EA value from the SHL entry is matched with a hashed store instruction EA value of an entry from the LHS table. The store instruction current itag value is identified from the LHS table entry. This itag value is dynamic and may differ for each execution of the respective load and store instructions. The store itag value is provided to the instruction sequencing unit (ISU) of the processor. The ISU creates a dependency between the load and store commands and delays the execution of the load instruction according to the current store itag value. Execution is delayed until after execution of the store command has begun, eliminating the OSC conflict. Subsequent to the execution of the load instruction without conflict, the results of the load instruction execution are returned to the processor.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise software program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, cache 162, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., application program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., application program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
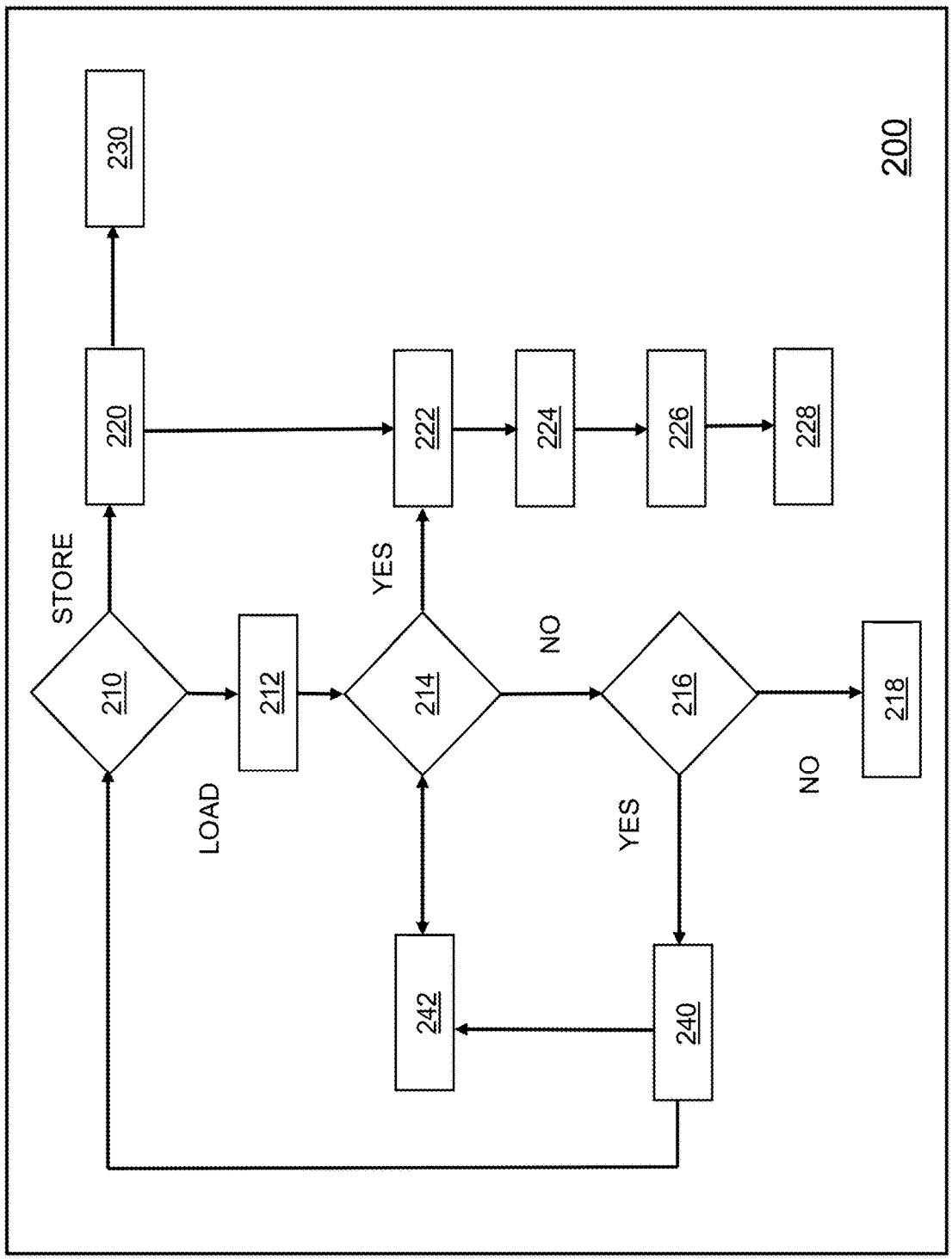
FIG. 2 provides a flowchart depicting an operational sequence, according to an embodiment of the invention.

FIG. 2 provides a flowchart 200, illustrating exemplary activities associated with the practice of the disclosure. After program start, the system receives an OSC instruction at 210. The OSC instruction is part of a current block of instructions received by the processor set from the program in persistent storage. The processor may fetch the block of instructions from the persistent memory. The OSC instruction may comprise a load instruction or a store instruction. At 210, the processor set evaluates the instructions as either a load or store instruction. For store instructions, the method proceeds to block 220. Store instructions include one or more parameters specifying the cache location (effective address) for the store and an instruction tag (itag). For a store instruction, the processor set creates a hashed value of the store command EA. The itag is determined at runtime and varies accordingly from one execution to the next. At 220 the processor set calculates a hash of the EA tag of the store instruction using any suitable hashing function. At 222, the processor set creates a new entry in a Load-Hit-Store (LHS) table stored in memory. The entry includes the current itag, hashed EA value and the parameters associated with the store command. The store instruction is then issued for execution at 230. The processor set receives a decoded load command from persistent memory requesting data from the cache. The load command includes an itag and load instruction effective address tag for the instruction. For a load instruction, the method proceeds to block 212. At block 212 the processor determines the load EA and creates a hash of the load EA. At block 214 the processor checks the SHL table for an entry having a matching load EA hash value. If there is not a matching SHL entry, at 216 the load instruction is issued and executed and the processor checks for OSC conflicts associated with the execution of the load command. Execution of the load command without triggering an OSC conflict proceeds at block 218. Executing the load command when as an associated command to store the requested data at the EA of the load command has not yet completed triggers an OSC conflict exception at block 216 and a flush at block 240. The method now pairs the load command and associated store command with each other. At block 242, the system creates a hash of the load command EA and stores the hashed load command EA in a store-hit-load (SHL) table entry. After the flush at 240, the load command is received again at 210. A hash of the load command EA from 212 is matched at 214 to the SHL entry associated with the previous conflict and flush stored at block 242. At block 222 the method identifies an LHS table entry having a store EA hash value matching the SHL entry. The method passes the current itag of the LHS table entry to the system ISU at block 224. At block 226 the ISU creates a dependency between the SHL entry load instruction and the LHS entry store instructions itag values and at block 228 the ISU delays the issuance of the load instruction until the store instruction completes, according to the dependency from block 226.

In an embodiment, the system processor set receives a decoded store command including a current itag and an EA from persistent memory. The processor set creates a hashed value of the store command EA and creates a new entry in a Load-Hit-Store (LHS) table stored in memory. The entry includes the current itag, hashed EA value and the parameters associated with the store command. In this embodiment, the processor set receives a decoded load command from persistent memory requesting data from the cache. The load command includes an itag and load instruction address tag for the command. Executing the load command triggers an OSC conflict exception and a flush, as an associated command to store the requested data at the EA of the load command has not yet completed. The load command and associated store command are paired with each other. The system creates a hash of the load command EA and stores the hashed load command EA and the hashed EA value of the associated store command in a store-hit-load (SHL) table entry. The system then compares the hashed store EA value of the SHL entry with the hashed store EA values of the LHS entries. The current itag of an LHS entry having a matching hashed store EA is sent to the ISU. The ISU creates a dependency between the load command and the store command such that the load command will not be issued until after the store command has completed. After the flush, the load command is received again. A hash of the load command EA is matched to the SHL entry associated with the previous conflict and flush. An LHS table entry having a store EA hash value matching the SHL entry is identified. The current itag of the LHS table entry is passed to the system ISU where a dependency between the load and store commands is created to prevent the OSC conflict and flush.

In an embodiment, a processor fetches a store instruction from persistent memory for processing. Initial processing of a store instruction yields a current itag and an effective address (EA) for the store instruction. The processor creates a hashed value of the EA tag and stores the itag and hashed EA tag in a first table. The hashed EA tag and itag values for all store instructions are stored in a single first table. The store instruction is executed. The processor fetches a load instruction from persistent memory for processing. Initial processing of a load instruction yields an index and a load tag for the load instruction. The load tag can comprise a hash of the load EA, or the load tag can comprise a portion of the bits of the load EA. The processor compares the load tag to entries in a second table. If no match is found in the second table, the instruction is executed. If an OSC conflict is detected, the load instruction is paired with the conflicting store instructions and a system flush occurs. The hashed address tag of the load instruction is stored in a second table together with an instruction index of the load instruction and the hashed EA of the conflicting store instruction. (The index can comprise a portion of the bits of the load address.) The processor compares the hashed EA tag values of the first table and second table. The processor passes the itag of an instruction having matching hashed EA tags to the ISU. The ISU creates an execution dependency between the first and second instructions according to the itag. The issuance and execution of the load instruction is then delayed by the ISU according to the created data dependency.

In an embodiment, a processor fetches a store instruction from persistent memory for processing. Initial processing of a store instruction yields a current itag and an effective address (EA) for the store instruction. The processor creates a hashed value of the EA tag and stores the itag and hashed EA tag in a first table. The hashed EA tag and itag values for all store instructions are stored in a single first table. The store instruction is executed. The processor fetches a load instruction from persistent memory for processing. Initial processing of a load instruction yields an index and a load tag for the load instruction. The load tag can comprise a hash of the load EA, or the load tag can comprise a portion of the bits of the load EA. The processor compares the load tag to entries in a second table. If no match is found in the second table, a default itag delta can be passed to the ISU. The load instruction execution is delayed according to the default itag delta. The default value can be system or user defined. the instruction is executed. After the default delay, the load command is executed. If an OSC conflict is detected, the load instruction is paired with the conflicting store instructions and a system flush occurs. The hashed address tag of the load instruction is stored in a second table together with an instruction index of the load instruction and the hashed EA of the conflicting store instruction. (The index can comprise a portion of the bits of the load address.) The processor compares the hashed EA tag values of the first table and second table. The processor passes the itag of an instruction having a matching hashed EA tag to the ISU. The ISU creates an execution dependency between the first and second instructions according to the itag. The issuance and execution of the load instruction is then delayed by the ISU according to the created data dependency.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
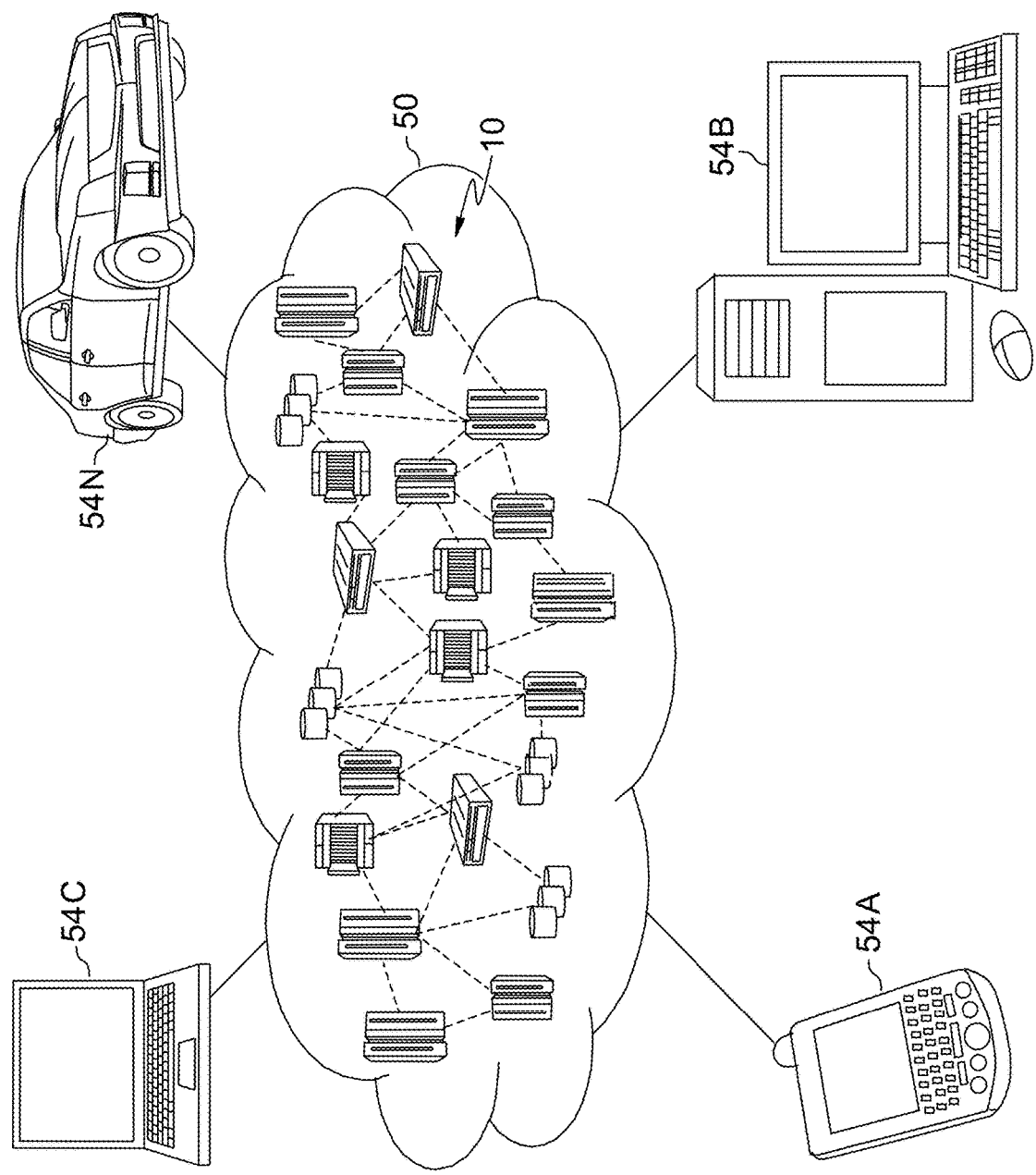
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
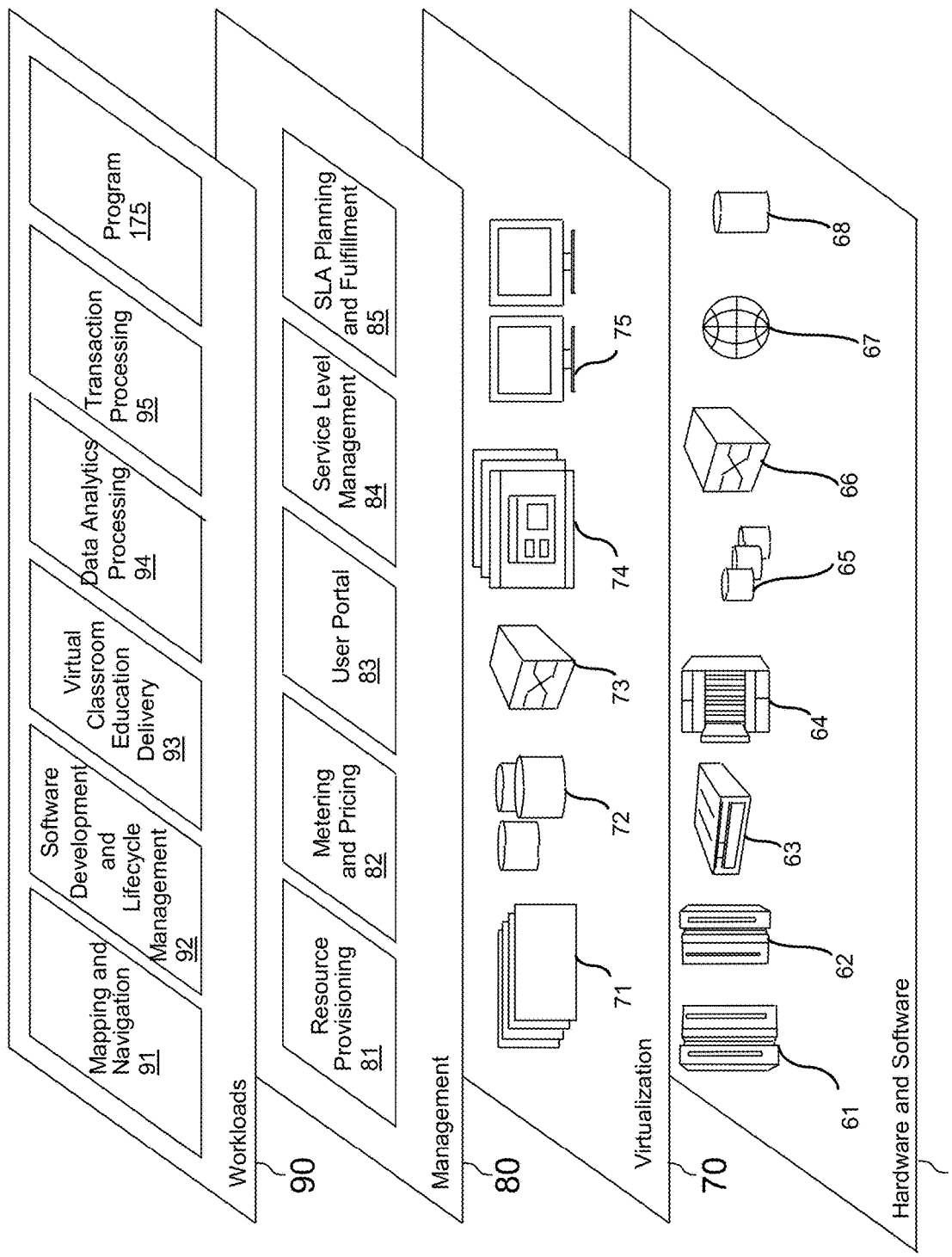
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing application execution, the method comprising:
processing, by one or more computer processors, a first store instruction, the processing yielding a first store instruction tag and a first store instruction effective address;
creating, by the one or more computer processors, a hash of the first store instruction effective address;
creating, by the one or more computer processors, a first entry in a first table, the first entry comprising the first store instruction tag and the hash of the first store instruction effective address;
receiving, by the one or more computer processors, a first load instruction;
processing, by the one or more computer processors, the first load instruction, the processing of the first load instruction yielding a first index and first load tag for the first load instruction;
detecting, by the one or more computer processors, an operand store compare (OSC) conflict between the first store instruction and the first load instruction;
in response to detecting the OSC conflict, creating, by the one or more computer processors, an entry in a second table, the entry comprising the first index, the first load tag, and the hash of the first store instruction effective address;
subsequent to a flush, receiving, by the one or more computer processors, the first load instruction again;
responsive to receiving the first load instruction again, processing, by the one or more computer processors, the first load instruction a second time, the processing of the first load instruction a second time yielding the first index and the first load tag for the first load instruction;
matching, by the one or more computer processors, the first load tag and the first load tag in the entry of the second table;
matching, by the one or more computer processors, the hash of the first store instruction effective address in the entry of the second table and the hash of the first store instruction effective address in the first entry of the first table;
providing, by the one or more computer processors, the first store instruction tag of the first store instruction from the first entry to an ISU (instruction sequencing unit);
creating a dependency between the first load instruction and the first store instruction; and
delaying execution, by the one or more computer processors, of the load instruction by the ISU, until after the first store instruction has completed.

2. The computer implemented method according to claim 1, further comprising:
returning, by one or more computer processors, load instruction results to a processor.

3. A computer program product for managing application execution, the computer program product comprising one or more computer readable storage media and stored program instructions on the one or more computer readable storage media, the stored program instructions comprising:
program instructions for receiving a first store instruction, the first store instruction comprising a store itag and a first store instruction address;
program instructions for creating a hash of the first store instruction address;
program instructions to create a first entry in a first table, the first entry comprising the store itag and the hash of the first store instruction address;

program instructions for receiving a first load instruction, the first load instruction comprising a load address;

program instructions to generate a first hash of the load address;

program instructions to detect an operand store compare (OSC) conflict between the first store instruction and the first load instruction;

program instructions to create an entry in a second table, the entry comprising the first hash of the load address and the hash of the first store instruction address;

subsequent to a flush, program instructions to receive the first load instruction again;

program instructions to generate a second hash of the load address;

program instructions for matching the second hash of the load address and the first hash of the load address stored in the entry in the second table;

program instructions to match the hash of the first store instruction address in the entry of the second table and the hash of the first store instruction address in the first entry of the first table;

program instructions for providing the store itag from the first entry in the first table to an ISU (instruction sequencing unit);

program instructions to create a dependency between the first load instruction and the first store instruction; and program instructions to delay execution of the first load instruction by the ISU, until after the first store instruction has completed.

4. The computer program product according to claim 3, the stored program instructions further comprising:

program instructions for returning load instruction results to a processor.

5. A computer system for managing application execution, the computer system comprising:

one or more computer processors;

one or more computer readable storage devices;

stored program instructions on the one or more computer readable storage devices for execution by the one or more computer processors, the stored program instructions comprising: program instructions for receiving a first store instruction, the first store instruction comprising a store itag and a first store instruction address;

program instructions for creating a hash of the first store instruction address;

program instructions to create a first entry in a first table, the first entry comprising the store itag and the hash of the first store instruction address;

program instructions for receiving a first load instruction, the first load instruction comprising a load address;

program instructions to generate a first hash of the load address;

program instructions to detect an operand store compare (OSC) conflict between the first store instruction and the first load instruction;

program instructions to create an entry in a second table, the entry comprising the first hash of the load address and the hash of the first store instruction address;

subsequent to a flush, program instructions to receive the first load instruction again;

program instructions to generate a second hash of the load address;

program instructions for matching the second hash of the load address and the first hash of the load address stored in the entry in the second table;

program instructions to match the hash of the first store instruction address in the entry of the second table and the hash of the first store instruction address in the first entry of the first table;

program instructions for providing the store itag from the first entry in the first table to an ISU (instruction sequencing unit);

program instructions to create a dependency between the first load instruction and the first store instruction; and program instructions to delay execution of the first load instruction by the ISU, until after the first store instruction has completed.

6. The computer system according to claim 5, the stored program instructions further comprising returning load instruction results to a processor.

* * * * *